United States Patent
Breault

(10) Patent No.: US 6,232,006 B1
(45) Date of Patent: May 15, 2001

(54) DUAL COOLANT LOOP FUEL CELL POWER PLANT

(75) Inventor: Richard D. Breault, North Kingstown, RI (US)

(73) Assignee: International Fuel Cells LLC, South Windsor, CT (US)

( * ) Notice: Subject to any disclaimer, the term of this patent is extended or adjusted under 35 U.S.C. 154(b) by 0 days.

(21) Appl. No.: 09/215,964

(22) Filed: Dec. 18, 1998

(51) Int. Cl.$^7$ .................................................. H01M 8/04
(52) U.S. Cl. .................................................. 429/26; 429/34
(58) Field of Search ................................. 429/26, 34, 24, 429/20

(56) References Cited

U.S. PATENT DOCUMENTS

| | | | |
|---|---|---|---|
| 4,344,849 | * 8/1982 | Grasso et al. | 210/662 |
| 4,769,297 | 9/1988 | Reiser et al. | 429/17 |
| 4,782,669 | * 11/1988 | Trocciola et al. | 62/434 |
| 5,470,671 | * 11/1995 | Fletcher et al. | 429/26 |
| 5,503,944 | 4/1996 | Meyer et al. | 429/13 |
| 5,573,866 | 11/1996 | Van Dine et al. | 429/13 |
| 5,700,595 | 12/1997 | Reiser | 429/13 |

* cited by examiner

Primary Examiner—Stephen Kalafut
Assistant Examiner—Julian A. Mercado
(74) Attorney, Agent, or Firm—Malcolm J. Chisholm

(57) ABSTRACT

A dual coolant loop fuel cell power plant is disclosed that includes at least one fuel cell for producing an electric current from a reducing fluid and an oxidant stream, wherein the fuel cell includes an electrolyte secured between an anode catalyst and a cathode catalyst. An anode flow field is defined adjacent the anode catalyst and extends between a reducing fluid inlet and a reducing fluid outlet. A cathode flow field is defined adjacent the cathode catalyst and extends between an oxidant inlet and an oxidant outlet. A reaction zone is defined within the anode and cathode flow fields co-extensive with the anode and cathode catalysts, and a condensation zone is defined extending from the oxidant outlet into the anode and cathode flow fields. A primary coolant loop directs a circulating primary coolant stream through the reaction zone of the fuel cell, and into a primary heat exchanger to remove heat from the reaction zone, and a secondary coolant loop directs a circulating secondary coolant stream through the condensation zone of the fuel cell, and into a secondary heat exchanger to remove heat from the condensation zone, and thereby condense water vapor in the oxidant stream and reducing fluid passing through the condensation zone. An air conditioning unit directs a refrigerant to the secondary heat exchanger to cool the circulating secondary coolant stream.

19 Claims, 3 Drawing Sheets

DUAL COOLANT LOOP FUEL CELL POWER PLANT

TECHNICAL FIELD

The present invention relates to fuel cell power plants that operate at about ambient pressures and are suited for usage in transportation vehicles, as portable power plants, or as stationary power plants, and the invention especially relates to a fuel cell power plant that utilizes coolant loops to enhance water balance and energy efficiency of the plant.

BACKGROUND OF THE INVENTION

Fuel cell power plants are well-known and are commonly used to produce electrical energy from reducing and oxidizing fluids to power electrical apparatus such as apparatus on-board space vehicles. In such power plants, a plurality of planar fuel cells are typically arranged in a stack surrounded by an electrically insulating frame that defines manifolds for directing flow of reducing, oxidizing, coolant and product fluids. Each individual cell generally includes an anode electrode or catalyst and a cathode electrode or catalyst separated by an electrolyte. A reducing fluid such as hydrogen is supplied to the anode catalyst, and an oxidant such as oxygen or air is supplied to the cathode catalyst. In a cell utilizing a proton exchange membrane as the electrolyte, the hydrogen electrochemically reacts at a surface of the anode catalyst to produce hydrogen ions and electrons. The electrons are conducted to an external load circuit and then returned to the cathode catalyst, while the hydrogen ions transfer through the electrolyte to the cathode catalyst, where they react with the oxidant and electrons to produce water and release thermal energy. It is common in fuel cell technology to refer to the locations of the aforesaid electrochemical reactions as "electrodes", which often is meant to include both a catalyst such as platinum and a support structure such as a porous carbon substrate. However, occasionally the term "electrode" also includes portions of the support structure that does not include a catalyst, such as an edge portion. For purposes of clarity herein, the term "catalyst" will be used, as "anode catalyst" and "cathode catalyst", instead of "electrode" to identify only the location of catalysts that catalyze electrochemical reactions within a fuel cell.

The anode and cathode catalysts of such fuel cells are separated by different types of electrolytes depending on operating requirements and limitations of the working environment of the fuel cell. One such electrolyte is a proton exchange membrane ("PEM") electrolyte, which consists of a solid polymer well-known in the art. Other common electrolytes used in fuel cells include phosphoric acid or potassium hydroxide held within a porous, nonconductive matrix between the anode and cathode catalysts.

It has been found that PEM cells have substantial advantages over cells with liquid acid or alkaline electrolytes in satisfying specific operating parameters because the membrane of the PEM provides a barrier between the reducing fluid and oxidant that is more tolerant to pressure differentials than a liquid electrolyte held by capillary forces within a porous matrix. Additionally, the PEM electrolyte is fixed, and cannot be leached from the cell, and the membrane has a relatively stable capacity for water retention. Furthermore, because specific electrode or catalyst reactions proceed rapidly in a PEM fuel cell, high power densities can be obtained at low catalyst loadings leading to a low cost power plant with high power densities. Finally, because a PEM fuel cell operates at low temperatures, a power plant including a stack of such fuel cells can be started rapidly providing operational flexibility for transportation and stationery applications. As is well-known however, PEM cells have significant limitations especially related to liquid water transport to, through and away from the PEM, and related to simultaneous transport of gaseous reducing and oxidant fluids to and from the catalysts adjacent opposed surfaces of the PEM. The prior art includes many efforts to minimize the effect of those limitations.

In operation of a fuel cell employing a PEM, the membrane is saturated with water, and the anode catalyst adjacent the membrane must remain wet. As hydrogen ions produced at the anode catalyst transfer through the electrolyte, they drag water molecules with them from the anode to the cathode. Water also transfers back to the anode from the cathode by osmosis. Product water formed at the cathode catalyst is removed by evaporation or entrainment into a circulating gaseous stream of oxidant, or by capillary action into and through a porous support fluid transport layer adjacent the cathode. Porous water transport plates supply liquid water from a supply of coolant water to the anode catalyst and remove water from the cathode catalyst returning it back to the coolant water supply, and the plates thereby also serve to remove heat from the electrolyte and catalysts, as described in U.S. Pat. Nos. 4,769,297 and 5,503,944 assigned to the assignee of the present invention.

During operation of PEM fuel cells, it is critical that a proper water balance be maintained between a rate at which water is produced at the cathode catalyst and rates at which water is removed from the cathode catalyst and at which liquid water is supplied to the anode catalyst. An operational limit on performance of a fuel cell is defined by an ability of the cell to maintain the water balance as electrical current drawn from the cell into the external load circuit varies and as an operating environment of the cell varies. For PEM fuel cells, if insufficient water is returned to the anode catalyst, adjacent portions of the PEM electrolyte dry out thereby decreasing the rate at which hydrogen ions may be transferred through the PEM and also resulting in cross-over of the reducing fluid leading to local over heating. Similarly, if insufficient water is removed from the cathode, the cathode catalyst may become flooded effectively limiting oxidant supply to the cathode and hence decreasing current flow. Additionally, if too much water is removed from the cathode by the gaseous stream of oxidant, the cathode may dry out limiting ability of hydrogen ions to pass through the PEM, thus decreasing cell performance.

As fuel cells have been integrated into power plants developed to power transportation vehicles such as automobiles, trucks, buses, etc., maintaining an efficient water balance within the power plant has become a greater challenge because of a variety of factors. For example, with a stationary fuel cell power plant, water lost from the plant may be replaced by water supplied to the plant from off-plant sources. With a transportation vehicle, however, to minimize weight and space requirements of a fuel cell power plant the plant must be self-sufficient in water to be viable. Self-sufficiency in water means that enough water must be retained within the plant to offset losses from reactant fluids exiting the plant in order to efficiently operate the plant. Any water exiting the plant through a plant exhaust stream consisting of a cathode exhaust stream of gaseous oxidant and/or an anode exhaust stream of gaseous reducing fluid must be balanced by water produced electrochemically at the cathode catalyst and water retained within the plant.

For example, an ambient pressure, gasoline powered PEM fuel cell must be self-sufficient in water to be a viable power source for vehicles. Such a power source requires fuel processing components to process the gasoline into a hydrogen rich reactant fluid. The fuel processing components use water heated to steam in a boiler to aid in processing the gasoline, and the water for the fuel processing components must be supplied from water produced at the cathode in the fuel cell as a result of the above described electrochemical reaction. As is well-known however, the water produced at the cathode catalyst is swept from the cell within the cathode exhaust stream. It is known to recover some of the water in the cathode exhaust stream by passing the cathode exhaust stream through a condensing heat exchanger to cool the stream and thereby condense the water out of the stream. The condensed water is then accumulated and directed to the fuel processing components as required to maintain the plant in water balance.

An example of a PEM fuel cell power plant using a condensing heat exchanger is shown in U.S. Pat. No. 5,573,866 that issued on Nov. 12, 1996 to Van Dine et al., and is assigned to the assignee of the present invention, and which patent is hereby incorporated herein by reference. Many other fuel cell power plants that use one or more condensing heat exchangers are well-known in the art, and they typically use ambient air streams as a cooling fluid passing through the exchanger to cool the plant exhaust streams. In Van Dine et al., the heat exchanger is used to cool an exhaust stream exiting a cathode chamber housing the cathode catalyst. Prior to entering the cathode housing, the same stream provides air as the oxidant for the cathode catalyst, and upon leaving the chamber the stream includes evaporated product water and some portion of methanol, the reducing fluid, that has passed through the PEM. The condensing heat exchanger passes the cathode exhaust stream in heat exchange relationship with a stream of cooling ambient air, and then directs condensed methanol and water indirectly through a piping system back to an anode side of the cell.

While condensing heat exchangers have enhanced water balance and energy efficiency of ambient fuel cell power plants, the heat exchangers encounter decreasing water recovery efficiency as ambient temperatures increase. Where the power plant is to power a transportation vehicle such as an automobile, the plant will be exposed to an extremely wide range of ambient temperatures. For example where an ambient air cooling fluid passes through a heat exchanger, performance of the exchanger will vary as a direct function of the temperature of the ambient air because decreasing amounts of liquid precipitate out of power plant exhaust streams as the ambient air temperature increases.

An additional complication of known fuel cell power plants designed for use in transportation vehicles is also related to fluctuations in ambient air conditions. Fuel cells of such plants typically utilize ambient air as the oxidant directed to the cathode catalyst. Hot and dry ambient air increases a risk that the cathode catalyst will dry out because such hot, dry air removes water more quickly by evaporation than does cool, moist oxidant supply air. Such hot, dry ambient air raises a dewpoint of the plant exhaust stream effectively moving the plant out of water balance.

Consequently, many efforts have been undertaken to prevent excess water loss resulting in drying out of the cathode catalyst and adjacent electrolyte especially in PEM fuel cells, including: directing liquid condensate from condensing heat exchangers to humidify gaseous reactant and oxidant streams entering the cell; adding porous support layers and water transport plates in fluid communication with the catalysts for movement of coolant water through adjacent cells; generating a pressure differential on the anode side of the cell wherein gaseous reducing fluids are maintained at a slightly higher pressure than coolant water and anode supply water passing through the porous support layers adjacent reducing gas distribution channels so that the pressure differential assists water transport through the porous support layers and cell; and, increasing air utilization by the cathode through decreasing volumetric flow of the oxidant stream by the cathode. Such efforts at maintaining efficient water balance involve additional cost, weight, volume burdens, fuel cell performance penalties, and often require complicated control apparatus.

An alternative approach to enhancing water balance for fuel cell power plants in transportation vehicles is to pressurize the cell and related components. This increases reactant concentrations in high pressure gaseous streams and also reduces water loss through plant exhaust streams by reducing volumetric flow of the streams. Such pressurized fuel cell power plants, however, require additional cost, weight and control apparatus in providing appropriate pressure housings and controls, and pressurized plants require additional energy derived from the plant to operate pressurizing pumps, valves, fans, etc., and are not known to be practical for portable power plants.

Accordingly, known pressurized plants and plants that employ ambient air as the cathode oxidant or that use ambient air for condensing heat exchangers are incapable of maximizing an efficient water balance and minimizing operating energy requirements because of their above described characteristics. It is therefore highly desirable to produce a fuel cell power plant that minimizes reliance upon ambient air cooled condensing heat exchangers to maintain the plant in water balance.

DISCLOSURE OF THE INVENTION

The invention is a dual coolant loop fuel cell power plant that includes at least one fuel cell for producing an electric current from a reducing fluid and an oxidant stream. The fuel cell includes an electrolyte secured between an anode catalyst and a cathode catalyst, an anode flow field defined adjacent the anode catalyst and extending between a reducing fluid inlet and a reducing fluid outlet, a cathode flow field defined adjacent the cathode catalyst and extending between an oxidant inlet and an oxidant outlet, a reaction zone defined within the anode and cathode flow fields co-extensive with the anode and cathode catalysts, and a condensation zone defined as extending from the oxidant outlet into the anode and cathode flow fields. A primary coolant loop directs a primary coolant stream through primary coolant passages within the reaction zone of the fuel cell, out of the fuel cell into a primary heat exchanger to remove heat from the reaction zone, and back into the primary coolant passages as a circulating primary coolant stream. A secondary coolant loop directs a secondary coolant stream through secondary coolant passages within the condensation zone of the fuel cell, out of the fuel cell into a secondary heat exchanger and back into the fuel cell as a circulating secondary coolant stream. An air conditioning unit directs a refrigerant to the secondary heat exchanger to cool the circulating secondary coolant stream.

The dual coolant loop fuel cell power plant may be used, for example, in a vehicle such as an automobile to power an electric motor to operate the vehicle wherein the oxidant supplied to the cathode catalyst is ambient air. As ambient temperatures climb based on a change in an operating environment of the vehicle, the oxidant supplied to the cathode catalyst increases in temperature and is therefore able to hold as water vapor an increased amount of water generated at the cathode catalyst as the oxidant stream moves through the reaction zone. Consequently, that increased amount of water vapor within both the oxidant stream and a reducing fluid stream within the fuel cell is at risk of being swept out of the fuel cell with the oxidant as a cathode exhaust stream and with the reducing fluid as an anode exhaust stream, and the fuel cell is in jeopardy of moving out of water balance. The air conditioning unit is then activated to supply refrigerant to the secondary heat exchanger to lower the temperature of the circulating secondary coolant stream which lowers the temperature of the oxidant stream and the reducing fluid passing through the condensation zone resulting in condensation of water vapor within the oxidant and reducing fluid streams before they leave the fuel cell. The condensation zone preferably includes porous layers to collect the condensed water and retain the condensed water within the fuel cell. Alternatively, the anode and cathode flow fields within the condensation zone may be solid defining voids and passageways wherein liquid condensate is removed by entrainment in the cathode and anode exhaust streams and collected in a liquid-air separator. By utilizing the secondary coolant loop having a refrigerant cooled heat exchanger, the power plant may be maintained in water balance without having to pass the fuel cell exhaust streams through an ambient air cooled condensing heat exchanger downstream of the fuel cell.

Accordingly, it is a general object of the present invention to provide a dual coolant loop fuel cell power plant that overcomes deficiencies of the prior art.

It is a more specific object to provide a dual coolant loop fuel cell power plant that utilizes a conventional air conditioning unit of a passenger vehicle such as an automobile to enhance water retention of a fuel cell power plant.

It is a further specific object to provide a dual coolant loop fuel cell power plant that includes components for retaining water within the plant that may be utilized while minimizing performance penalties of the cell.

These and other objects and advantages of this invention will become more readily apparent when the following description is read in conjunction with the accompanying drawings.

DESCRIPTION OF THE PREFERRED EMBODIMENTS

Figure 1:
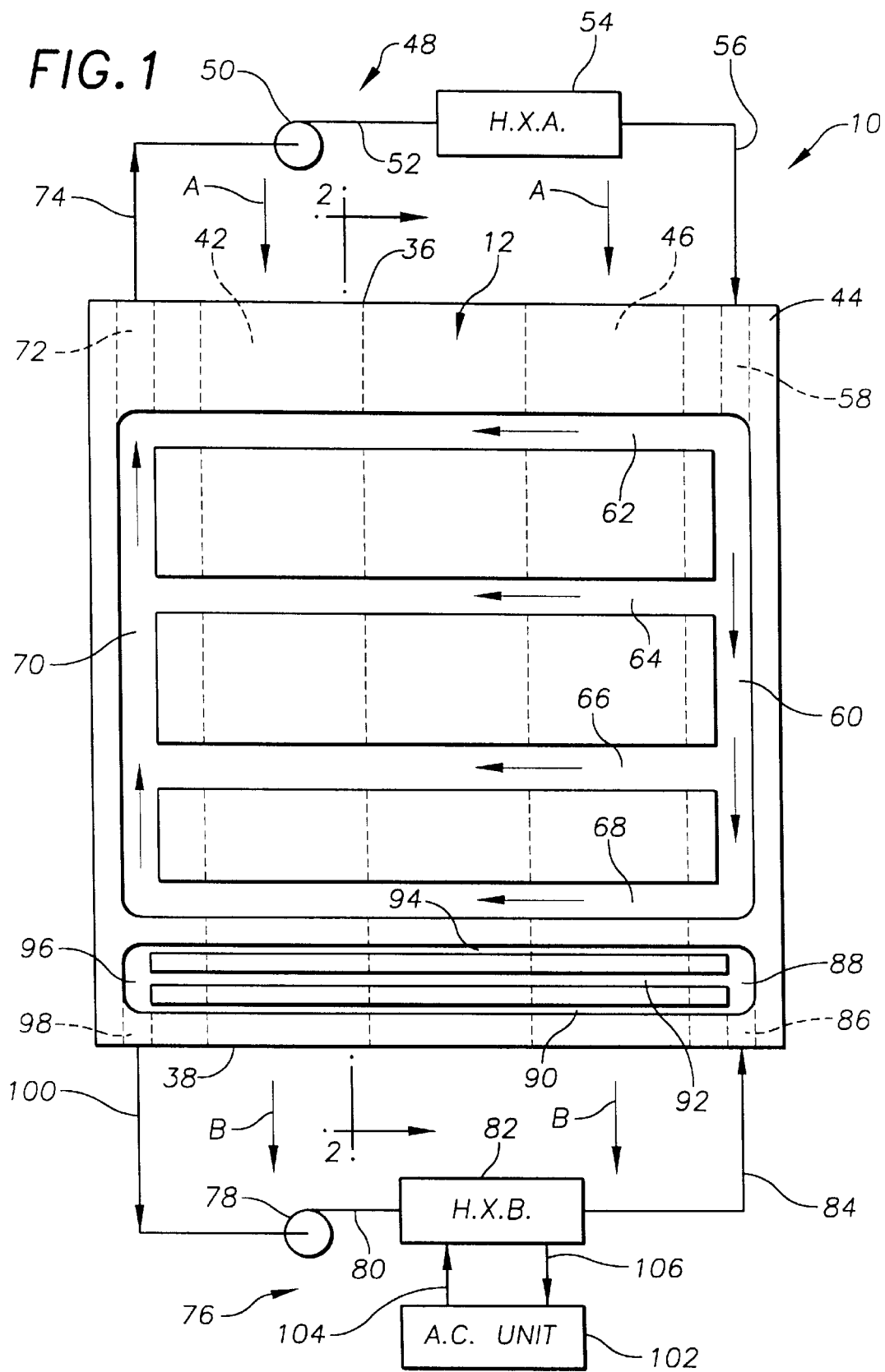
FIG. 1 is a schematic, cross-section view of a dual coolant loop fuel cell power plant constructed in accordance with the present invention.

Referring to the drawings in detail, a dual coolant loop fuel cell power plant constructed in accordance with the present invention is shown schematically in FIG. 1, and generally designated by the reference numeral 10. The system includes at least one fuel cell means for producing an electric current from a reducing fluid and an oxidant stream, such as fuel cell 12 (shown best in FIG. 2). The fuel cell 12 includes an electrolyte 14 such as a proton exchange membrane ("PEM") or an acid or base electrolyte; an anode catalyst 16, supported by an anode support layer 18 in intimate contact with the anode catalyst 16, an anode water transport plate 20 in contact with the anode support layer 18; and, a cathode catalyst 22, supported by a cathode support layer 24 in intimate contact with the cathode catalyst 22, and a cathode water transport plate 26 in contact with the cathode support layer 24.

The anode water transport plate 20 may be formed of porous or non-porous graphite, carbon or metal layers so that pores, channels or voids in the anode water transport plate 20 cooperate to define an anode flow field 28 adjacent the anode catalyst 16 and extending between a reducing fluid inlet 30 and a reducing fluid outlet 32 for directing the reducing fluid to pass by the anode catalyst 16. Similarly, cathode water transport plate 26 may also be formed of porous or non-porous graphite, carbon or metal layers so that pores, voids or channels in the cathode water transport plate 26 cooperate to define a cathode flow field 34 adjacent the cathode catalyst 22 and extending between an oxidant inlet 36 and an oxidant outlet 38 for directing the oxidant stream to pass by the cathode catalyst 22. As shown for example in FIG. 2, the anode water transport plate 20 defines a plurality of reducing fluid feed channels 40A, 40B, 40C, 40D, 40E, that are in fluid communication with the reducing fluid inlet 30 and outlet 32 to facilitate distribution of a reducing fluid within the anode flow field 28, and pores of the anode water transport plate and adjacent anode support layer 18 further facilitate distribution of the reducing fluid to the anode catalyst 16. The cathode water transport plate 26 similarly defines an oxidant passage 42 extending between oxidant inlet 36 and oxidant outlet 38, and pores of the cathode support layer 24 facilitate distribution of the oxidant to the cathode catalyst 22.

Figure 2:
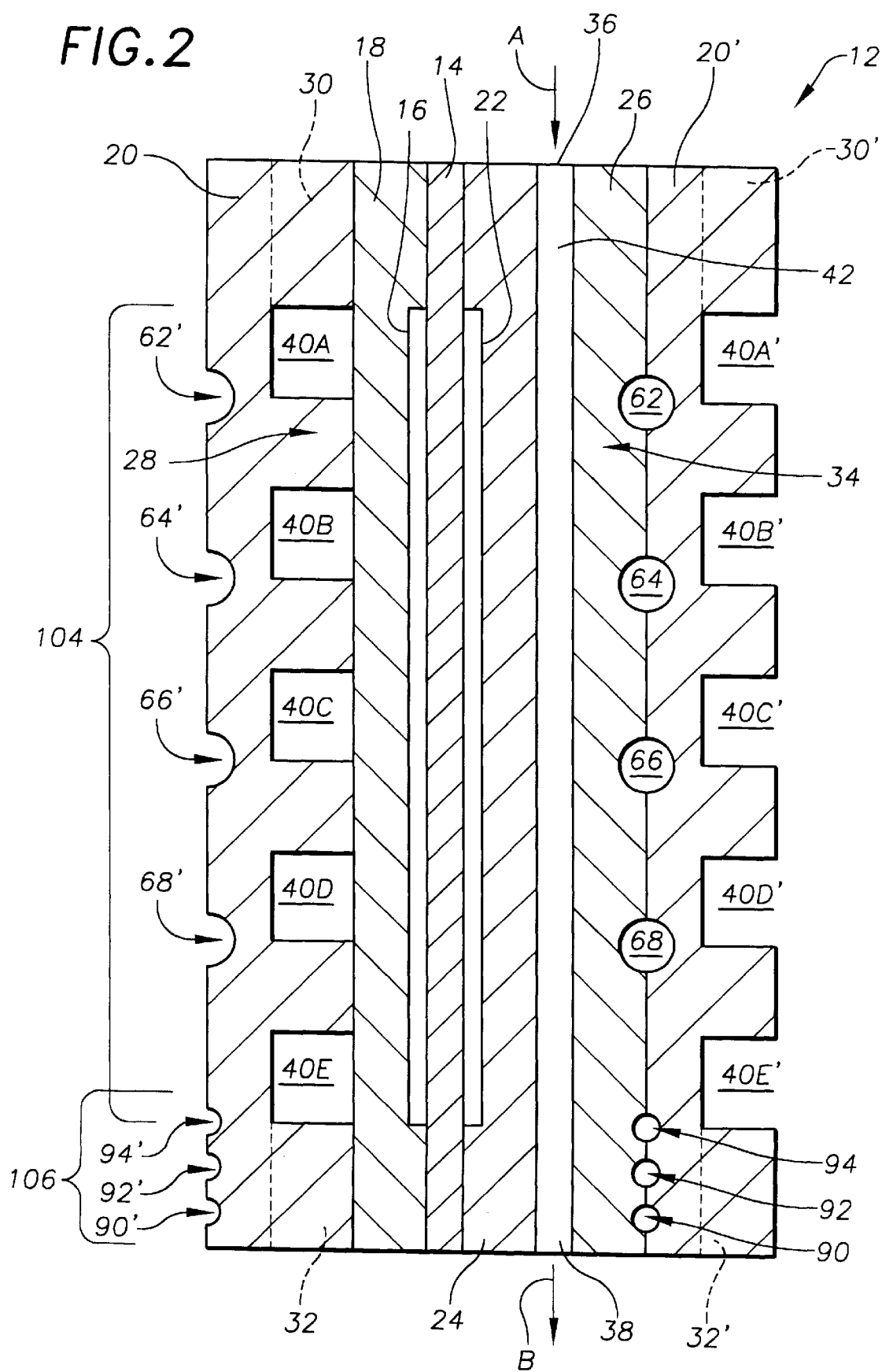
FIG. 2 is a schematic, cross-section view taken along sight line 2—2 of FIG. 1 showing a fuel cell of the FIG. 1 dual coolant loop fuel cell power plant.

It is noted that a second anode water transport plate 20' is shown in FIG. 2 adjacent the cathode water transport plate 26 to facilitate understanding of stacking of fuel cells together to form a cell stack assembly ("CSA") well-known in the art. Elements of that second anode water transport plate 20' are the same as elements of the anode water transport plate 20, and are designated by primes of the same reference numerals as for the plate 20, such as 30', etc. It is also stressed that, while the FIG. 2 juxtaposition of the oxidant passage 42 and reducing fluid feed channels 40A–40E appears to provide for movement of the reducing fluid and oxidant in a crossing flow pattern (e.g., along axes at ninety degrees to each other), the present invention is not limited to such a relationship, and opposed flow, parallel flow, or any flow that provides for efficient distribution of the reducing fluid and oxidant reactants as facilitated by effective manifolding well-known in the art is within the scope of the invention. What is critical, however, for an understanding of the invention is the flow direction of the oxidant through the cell. For ease of understanding, a first directional arrow labelled "A" and a second directional arrow labelled "B" (two each being shown in FIG. 1, while one each is shown in FIG. 2) serve to emphasize that flow of the oxidant through the fuel cell 12 is from the oxidant inlet 36 to and through the oxidant outlet 38; namely, from "A" to "B". The reducing fluid also flows through the fuel cell 12 in a direction essentially from the reducing fluid inlet 30 to the reducing fluid outlet 32 so that the reducing fluid flows through reducing fluid feed channel 40E adjacent the reducing fluid outlet 32 prior to leaving the fuel cell.

The fuel cell 12 may be combined with other virtually identical fuel cells (not shown) in a well-known manner to form a CSA enclosed within a frame or structure 44 shown schematically in FIG. 1 that defines manifolds for directing a reducing fluid stream and oxidant stream into and out of the fuel cell 12 so that the oxidant stream is seen schematically in FIG. 1 as flowing in a direction from the "A" arrows to the "B" directional arrows between the oxidant inlet 36 an oxidant outlet 38. FIG. 1 also shows a second oxidant channel 46 extending between the oxidant inlet 36 and outlet 38.

A primary coolant loop 48 (shown schematically in FIG. 1) directs a circulating primary coolant stream such as water from a primary pump 50 through a first primary conduit 52 into a primary heat exchanger 54 (shown schematically in FIG. 1 with the abbreviation "H.X.A." for ease of understanding) in heat exchange relationship with a cooling fluid such as ambient air; through a second primary conduit 56 into a primary coolant inlet 58 and primary inlet manifold 60 defined within the frame 44; through primary coolant passages 62, 64, 66, 68 from the primary inlet manifold into a primary exit manifold 70; and, out of the frame 44 within a primary coolant outlet 72 defined within the frame 44 to a primary coolant return line 74 and back to the primary pump 50 to complete the primary coolant loop 48. Directional arrows are shown in FIG. 1 in the primary inlet manifold 60, coolant passages 62, 64, 66, 68 and primary exit manifold 70 to facilitate understanding of flow of the circulating primary coolant stream within the primary coolant loop 48.

A secondary coolant loop 76 is also shown in FIG. 1 schematically, and it directs a circulating secondary coolant stream such as water from a secondary pump 78 through a first secondary conduit 80 into a second or secondary heat exchanger 82 (shown in FIG. 1 with the abbreviation "H.X.B.") in heat exchange relationship with a cooling fluid such as ambient air; through a secondary inlet conduit 84 into a secondary coolant inlet 86 and secondary feed manifold 88 defined within the frame 44; through secondary coolant passages 90, 92, 94 from the secondary feed manifold 88 into a secondary exit channel 96; and out of the frame 44 within a secondary coolant outlet 98 defined within the frame 44 to a secondary coolant return line 100 and back to the secondary pump 78 to complete flow of the circulating coolant stream within the secondary coolant loop 76. The secondary coolant loop 76 also includes air conditioning means such as an air conditioning unit 102 (shown schematically in FIG. 1 with the abbreviation "A.C. UNIT" for ease of understanding) for supplying a refrigerant through a refrigerant delivery line 101 to the secondary heat exchanger 82, wherein the refrigerant is disposed in heat exchange relationship with the circulating secondary coolant stream. The refrigerant returns to the air conditioning unit 102 from the secondary heat exchanger through a refrigerant return line 103.

The air conditioning unit 102, and the refrigerant delivery and return lines 101, 103 primary and secondary heat exchangers 54, 82 may also be manufactured by those skilled in the art from conventional air conditioning systems commonly known in the art for conditioning air of automobiles, trucks, busses, etc. Both the primary and secondary heat exchangers 54, 82 are structured to continuously use ambient air as a cooling fluid to remove heat from the circulating primary and secondary coolant streams respectively. However, as ambient air increases in temperature, the air conditioning unit becomes operative to cool the circulating secondary coolant stream. The primary coolant passages 62, 64, 66, 68 and secondary coolant passages 90, 92, 94 may be manufactured of standard piping components well-known in the art, or for example may be defined as corresponding half passages in the cathode water transport plate 26, and an adjacent anode water transport plate 20', as shown in FIG. 2. To avoid confusion, the half passages of anode water transport plate 20 that are not shown as enclosed by any adjacent cathode water transport plate are given reference numeral that are primes of the aforesaid reference numerals designating the primary and secondary coolant passages defined between cathode water transport plate 26 and anode water transport plate 20', namely 62', 64', 66', 68' 90', 92' and 94'.

As shown best in FIG. 2, the fuel cell 12 includes a reaction zone 104 defined within the anode and cathode flow fields 28, 34 and co-extensive with the anode catalyst 16 and cathode catalyst 22. By the word "co-extensive", it is meant that the reaction zone includes an area that approximately overlaps the anode and cathode catalysts 16, 22 and extends away from the anode catalyst 16 into the anode flow field 28, and extends away from cathode catalyst 22 into the cathode flow field 34. By defining the reaction zone 104 within the fuel cell 12, it is meant to describe both an area in which electrochemical reactions take place at and adjacent to catalysts such as platinum and other catalysts well-known in the art within the anode and cathode catalysts 16, 22 and also an area nearby such reactions that receives heat generated by those electrochemical reactions, such as heat generated at the cathode catalyst 22.

The fuel cell also includes a condensation zone 106 that is defined as extending from the oxidant outlet 38 into the cathode flow field 34 and anode flow field 28 a distance adequate to effect condensation of water vapor within the oxidant stream in the oxidant passages 42, 46 in the cathode flow field 34 as the oxidant stream passes through the cathode flow field 34, and a distance adequate to effect condensation of water vapor within the reducing fluid in the feed channels such as in reducing fluid feed channel 40E shown in FIG. 2, as the reducing fluid passes from the reducing fluid inlet 30 to the reducing fluid outlet 32. The condensation zone 106 may extend from the oxidant outlet 38 into the cathode and anode flow fields 28, 34 a distance that is no greater than approximately twenty per cent of a direct flow path of the oxidant stream through the cathode flow field 34, which is defined herein as a shortest distance between the oxidant inlet 36 and oxidant outlet 38. Optimally the condensation zone extends from the oxidant outlet 38 into the cathode and anode flow fields 28, 34 a distance that is no greater than approximately ten per cent of the direct flow path of the oxidant stream through the cathode flow field 34.

As best seen in FIG. 2, the primary coolant passages 62, 64, 66, 68 pass through the reaction zone 104 so that heat within the reaction zone 104 is removed by the circulating primary coolant stream from the fuel cell 12, and partially eliminated from the power plant 10 by the primary heat exchanger 54. Similarly, the secondary coolant passages 90, 92, 94 pass through the condensation zone 106 so that heat within the condensation zone 106 is removed by the circulating secondary coolant stream from the fuel cell 12, and partially eliminated from the plant 10 by the secondary heat exchanger 82. It is stressed that the reaction zone 104 and condensation zone 106 are not limited by specific borders, and may overlap as shown in FIG. 2. In particular, an actual distance of extension of the condensation zone 106 into the cathode and anode flow fields 34, 28 would be determined as a function of a cooling capacity of the primary and secondary coolant loops 48, 76, anticipated heat generation during operation of the fuel cell 12, and anticipated conditions of the oxidant stream based on planned usage of the dual coolant loop fuel cell power plant 10. Cooling capacity of the secondary coolant loop 76 including placement and numbers of secondary coolant passages such as passages 90, 92, 94 would be designed to achieve water self-sufficiency of the plant 10 under anticipated operating conditions so that water generated at the cathode catalyst and retained within the plant 10 exceeds water used and/or lost by the plant 10. By utilizing the air conditioning unit 102 to cool the secondary heat exchanger 82, the secondary coolant loop 76 is able to cool the oxidant stream passing through the condensation zone 106 to a sufficiently low temperature to produce condensation of water vapor within the oxidant stream, thereby effectively reducing a dewpoint of the oxidant stream exiting the oxidant outlet 38 to become plant exhaust.

As shown in FIG. 2, the condensation zone 106 includes portions of the cathode support layer 24, cathode water transport plate 26, anode water transport plate, 20, 20', and anode support layer 18, all of which may be porous layers that support flow of both liquid and gaseous coolant, reactant and product fluids through the fuel cell 12. Therefore, water vapor condensed out of the oxidant stream passing through the condensation zone 102 may readily pass into the cathode support layer 24 or cathode water transport plate 26 to move throughout the cell as a coolant, or to move into the primary or secondary coolant passages 62, 64, 66, 68, 90, 92, 94 to become part of the circulating primary or secondary coolant streams.

The dual coolant loop fuel cell power plant 10 may be for example an ambient pressure, gasoline fueled power plant utilized to power a transportation vehicle such as an automobile, truck, bus, etc., wherein the gasoline is reformed into a hydrogen rich reducing fluid through fuel processing means well-known in the art. Design estimates of such a use of the power plant 10 of the present invention have established that the primary coolant loop 48 would operate optimally by utilizing a primary heat exchanger 54 such as a standard automobile radiator and primary coolant passages that are dimensioned to have a capacity to deliver the circulating primary coolant stream to the primary coolant inlet 58 at a temperature of approximately 150 degrees fahrenheit (hereafter "°F.") and remove the circulating primary coolant stream from the primary coolant outlet 72 at a temperature of approximately 170° F. Additionally, the secondary coolant loop will perform optimally by utilizing a secondary heat exchanger 82 and air conditioning unit 102, such as a standard automobile air conditioning unit, and secondary coolant passages that are dimensioned to have a capacity to deliver the circulating secondary coolant stream to the secondary inlet 86 at a temperature of approximately 90° F., and remove the circulating secondary coolant stream from the secondary outlet 98 at a temperature of approximately 110° F. as the plant 10 is operated throughout a normal anticipated range of temperatures of ambient air that serves as both the oxidant for the fuel cell 12 and also as the cooling fluid for the primary and secondary heat exchangers for known transportation vehicles.

Figure 3:
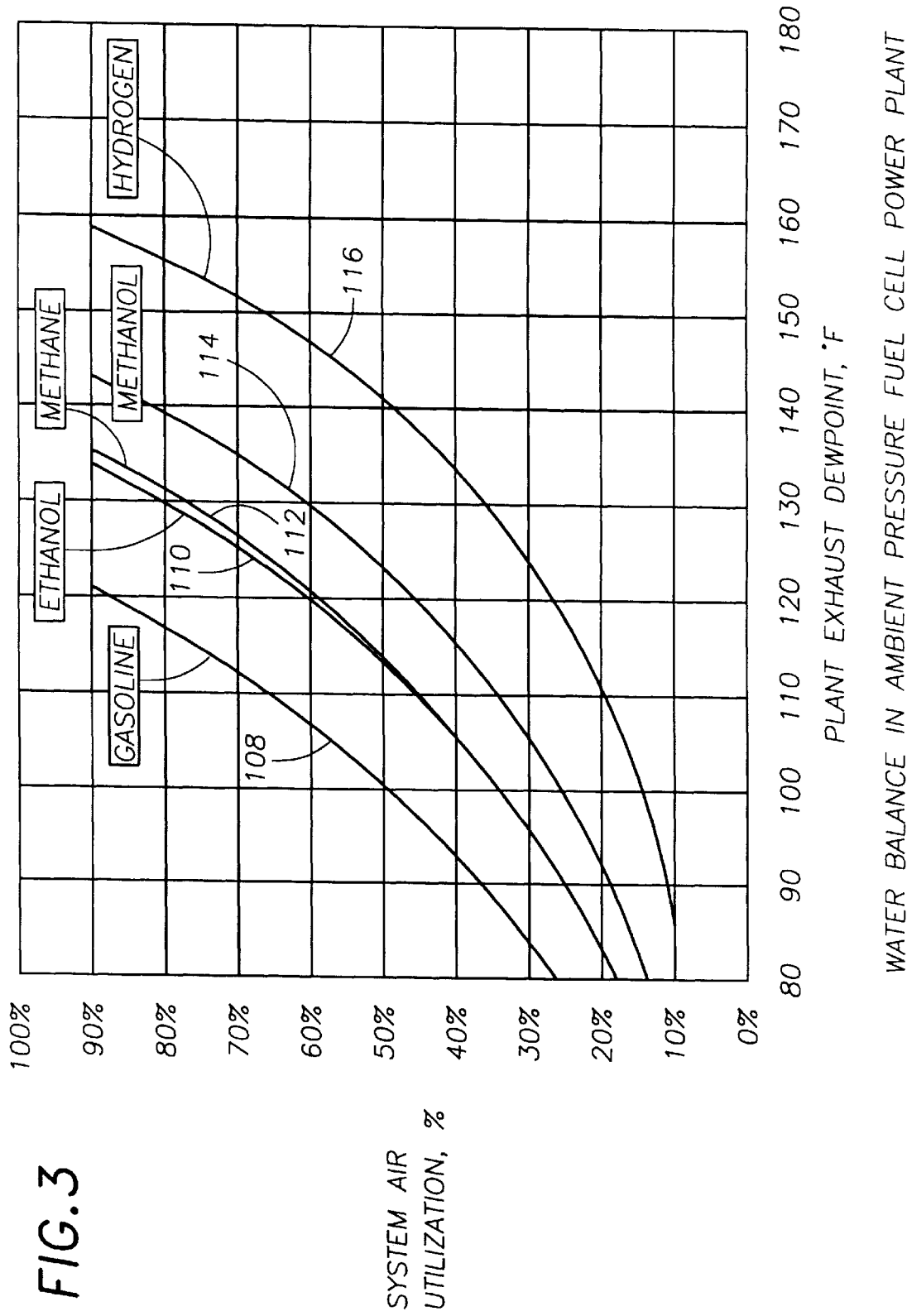
FIG. 3 is a graph showing a correlation between air utilization of a fuel cell and a plant exhaust dewpoint for a variety of potential reducing fluid fuels for a fuel cell to explain maintenance of a water balance in the fuel cell.

The above described operating ranges of temperatures of the circulating primary and secondary coolant streams are consistent with anticipated rates of air utilization by the fuel cell of between thirty five to forty eight per cent. FIG. 3 aids in explaining how the dual loop fuel cell power plant 10 of the present invention helps achieve water self-sufficiency by plotting data on a graph related to both per cent air utilization and plant exhaust dewpoints. The FIG. 3 graph is entitled "Water Balance in Ambient Pressure Fuel Cell Power Plant", and shows a relationship between "Plant Exhaust Dewpoint" on an X axis and "System Air Utilization, %" on a Y axis. The phrase "System Air Utilization, %" means the ratio of air taken from the oxidant stream and utilized by the dual loop fuel cell power plant 10 in generating an electric current to the quantity of oxidant supplied to the power plant 10. The graph shows that water self-sufficiency or water balance is maintained at increasingly higher plant exhaust dewpoints as the air utilization increases. Raising the air utilization reduces the vapor pressure difference between the oxidant stream entering the oxidant passage at the oxidant inlet 36 and the plant exhaust stream leaving the cell at the oxidant outlet 38, so that less water evaporates into the cathode exhaust stream to leave the cell. Therefore, by raising system air utilization, water balance is achieved at increasingly higher plant exhaust dewpoints which enables the fuel cell 12 to operate at water self-sufficiency or in water balance at higher ambient temperatures.

FIG. 3 plots a water-balance relationship between air utilization and dewpoint for five common fuels, wherein gasoline is represented by line 108, ethanol by line 110, methane by line 112, methanol by line 114, and hydrogen by line 116. If a plot of the system air utilization and plant exhaust dewpoint for one of the fuels at any given time remains above the line for that fuel 108, 110, 112, 114 or 116, then the fuel cell power plant is in water balance, so that the amount of water being lost through the plant exhaust stream is less than the amount of water required for water self-sufficiency. For example, if the fuel is gasoline, the system air utilization is 40% and the plant exhaust dewpoint is 90° F., the power plant 10 is in water balance. However, if the system air utilization suddenly shifts to 30%, a plant operating point is then below the water-balance line 108, and the plant 10 is out of water balance and in jeopardy of having inadequate water to operate the plant 10.

One method of returning the system back to water balance is to increase the per cent air utilization through use of an oxidant blower (not shown) upstream of the oxidant inlet 36 to decrease volumetric flow of the oxidant stream passing into the cathode flow field 34 through the oxidant passage 42, and thereby increase per cent air utilization and decrease water loss. However use of such an oxidant blower can only effect air utilization within a limited range and is not an adequate solution for an ambient pressure fuel cell power plant. A better approach to returning the plant to water balance is through use of the air conditioning unit 102 of the secondary coolant loop 76 to reduce the plant exhaust dewpoint by reducing the temperature of the oxidant passing through the oxidant stream passage 42 and cathode flow field 34 and of the reducing fluid stream passing through the reducing fluid feed channel 40E and the anode flow field 28 within the condensation zone 106. By using the secondary coolant loop 76 in such a manner, the plant 10 may be maintained in water balance without need of a condensing heat exchanger downstream of the oxidant outlet 38 as is common in the art, and the primary heat exchanger 54 may be of a smaller structure than would be possible if the secondary coolant loop 76 did not have the conditioning unit 102.

Under most operating conditions, a method of operating the dual coolant loop power plant 10 includes the steps of directing the circulating primary coolant stream through the reaction zone 104 and through the first ambient cooled heat exchanger 54 to remove heat from the reaction zone, and directing the circulating secondary coolant stream through the condensation zone and through the ambient cooled secondary heat exchanger 82 to remove heat from the condensation zone. However, upon transition of the plant out of water balance or water self-sufficiency by a sudden decrease in a rate of air utilization or by an increase in plant exhaust dewpoints as a result of higher ambient temperatures, the method of operation of the plant 10 includes activating the air conditioning unit to direct a refrigerant to the secondary heat exchanger 82 of the secondary coolant loop to rapidly cool the circulating secondary coolant stream and thereby cool the oxidant and reducing fluid within the condensation zone and thereby condense water vapor out of the oxidant stream and reducing fluid so that the condensed water vapor remains within the plant 10 to quickly return the plant to water self-sufficiency.

While the present invention has been described and illustrated with respect to a particular construction of a dual coolant loop fuel cell power plant 10, it is to be understood that the invention is not to be limited to the described and illustrated embodiments. For example, the power plant may include fuel processing component means for processing fuels such as gasoline into a hydrogen rich reducing fluid fed to the anode flow field 28, wherein liquid water is directed from the primary or secondary coolant loops 48, 76 to such fuel processing components as thermal reformers well-known in the fuel processing art. Accordingly, reference should be made primarily to the attached claims rather than the foregoing description to determine the scope of the invention.

What is claimed is:

1. A dual coolant loop fuel cell power plant, comprising:
   a. at least one fuel cell having an electrolyte secured between an anode catalyst and a cathode catalyst for producing an electric current from a reducing fluid and an oxidant stream, an anode flow field defined adjacent the anode catalyst and extending between a reducing fluid inlet and a reducing fluid outlet for directing the reducing fluid to pass by the anode catalyst, a cathode flow field defined adjacent the cathode catalyst and extending between an oxidant inlet and an oxidant outlet for directing the oxidant stream to pass by the cathode catalyst, a reaction zone defined within the anode and cathode flow fields and co-extensive with the anode and cathode catalysts, a condensation zone defined as extending from the oxidant outlet into the cathode and anode flow fields a distance adequate to effect condensation of water vapor within the oxidant stream and reducing fluid passing through the condensation zone;
   b. a circulating primary liquid coolant stream pumped through the reaction zone by a primary pump so that the circulating primary liquid coolant stream removes heat from the reaction zone;
   c. a circulating secondary liquid coolant stream pumped through the condensation zone by a secondary pump so that the circulating secondary liquid coolant stream removes heat from the condensation zone; and
   d. an air conditioning means for providing a refrigerant to a secondary heat exchanger in heat exchange relationship with the circulating secondary liquid coolant stream to cool the secondary coolant stream.

2. The dual coolant loop fuel cell power plant of claim 1, further comprising a primary coolant loop that directs the circulating primary liquid coolant stream through a primary heat exchanger, through a primary coolant passage passing through the reaction zone, and back to the primary heat exchanger.

3. The dual coolant loop fuel cell power plant of claim 2, wherein the primary heat exchanger and primary coolant passages are dimensioned to deliver the circulating primary liquid coolant stream to the reaction zone at a temperature of approximately 150° F., and remove the primary liquid coolant stream from the reaction zone at a temperature of approximately 170° F.

4. The dual coolant loop fuel cell power plant of claim 1, further comprising a secondary coolant loop that directs the circulating secondary liquid coolant stream through the secondary heat exchanger, through a secondary coolant passage passing through the condensation zone, and back to the secondary heat exchanger.

5. The dual coolant loop fuel cell power plant of claim 4, wherein the secondary heat exchanger, air conditioning means and secondary coolant passages are dimensioned to deliver the circulating secondary liquid coolant stream to the condensation zone at a temperature of approximately 90° F., and remove the secondary coolant stream from the condensation zone at a temperature of approximately 110° F.

6. The dual coolant loop fuel cell power plant of claim 1, wherein the condensation zone further comprises porous layers within the anode and cathode flow fields so that water condensed out of the oxidant stream and reducing fluid passes directly into the anode and cathode flow fields.

7. The dual coolant loop fuel cell power plant of claim 1, wherein the condensation zone extends from the oxidant outlet into the cathode and anode flow fields a distance no greater than approximately twenty per cent of a direct flow path of the oxidant stream through the cathode flow field.

8. The dual coolant loop fuel cell power plant of claim 1, wherein the condensation zone extends from the oxidant outlet into the cathode and anode flow fields a distance no greater than approximately ten per cent of a direct flow path of the oxidant stream through the cathode flow field.

9. A dual coolant loop fuel cell power plant, comprising:
   a. at least one fuel cell having an electrolyte secured between an anode catalyst and a cathode catalyst for producing an electric current from a reducing fluid and an oxidant stream, an anode flow field defined adjacent the anode catalyst and extending between a reducing fluid inlet and a reducing fluid outlet for directing the reducing fluid to pass by the anode catalyst, a cathode flow field defined adjacent the cathode catalyst and extending between an oxidant inlet and an oxidant outlet for directing the oxidant stream to pass by the cathode catalyst, a reaction zone defined within the anode and cathode flow fields and co-extensive with the anode and cathode catalysts, a condensation zone defined as extending from the oxidant outlet into the cathode and anode flow fields a distance no greater than approximately twenty per cent of a direct flow path of the oxidant stream through the cathode flow field;
   b. a circulating primary liquid coolant stream pumped through the reaction zone by a primary pump so that the circulating primary liquid coolant stream removes heat from the reaction zone;
   c. a circulating secondary liquid coolant stream pumped through the condensation zone by a secondary Dump so that the circulating secondary liquid coolant stream removes heat from the condensation zone.

10. The dual coolant loop fuel cell power plant of claim 9, further comprising an air conditioning unit that provides a refrigerant to a secondary heat exchanger in heat exchange relationship with the circulating secondary liquid coolant stream to cool the secondary liquid coolant stream.

11. The dual coolant loop fuel cell power plant of claim 10, further comprising a primary coolant loop that directs the circulating primary liquid coolant stream through a primary heat exchanger, through a primary coolant passage passing through the reaction zone, and back to the primary heat exchanger.

12. The dual coolant loop fuel cell power plant of claim 11, further comprising a secondary coolant loop that directs the circulating secondary liquid coolant stream through the secondary heat exchanger, through a secondary coolant passage passing through the condensation zone, and back to the secondary heat exchanger.

13. The dual coolant loop fuel cell power plant of claim 12, wherein the condensation zone further comprises porous layers within the anode and cathode flow fields so that water condensed out of the oxidant stream and reducing fluid passes directly into the anode and cathode flow fields and into the secondary coolant stream.

14. The dual coolant loop fuel cell power plant of claim 13, wherein the condensation zone extends from the oxidant outlet into the cathode and anode flow fields a distance no greater than approximately ten per cent of a direct flow path of the oxidant stream through the cathode flow field.

15. The dual coolant loop fuel cell power plant of claim 14, wherein the primary heat exchanger and primary coolant passages are dimensioned to deliver the circulating primary liquid coolant stream to the reaction zone at a temperature of approximately 150° F., and remove the primary liquid coolant stream from the reaction zone at a temperature of approximately 170° F.

16. The dual coolant loop fuel cell power plant of claim 15, wherein the secondary heat exchanger, air conditioning means and secondary coolant passages are dimensioned to deliver the circulating secondary liquid coolant stream to the condensation zone at a temperature of approximately 90° F., and remove the secondary coolant stream from the condensation zone at a temperature of approximately 110° F.

17. A method of operating a dual coolant loop fuel cell power plant including at least one fuel cell having an electrolyte secured between an anode catalyst and a cathode catalyst for producing an electric current from a reducing fluid and an oxidant stream, an anode flow field defined adjacent the anode catalyst and extending between a reducing fluid inlet and a reducing fluid outlet for directing the reducing fluid to pass by the anode catalyst, a cathode flow field defined adjacent the cathode catalyst and extending between an oxidant inlet and an oxidant outlet for directing the oxidant stream to pass by the cathode catalyst, a reaction zone defined within the anode and cathode flow fields and co-extensive with the anode and cathode catalysts, a condensation zone defined as extending from the oxidant outlet into the cathode and anode flow fields a distance adequate to effect condensation of water vapor within the oxidant stream and reducing fluid passing through the condensation zone, the method comprising the steps of:

a. pumping with a primary pump a circulating primary liquid coolant stream to pass through the reaction zone to remove heat from the reaction zone;

b. pumping with a secondary pump a circulating secondary liquid coolant stream to pass through the condensation zone to remove heat from the condensation zone;

c. activating an air conditioning unit to direct refrigerant to a secondary heat exchanger in heat exchange relationship with the circulating secondary liquid coolant stream to cool the secondary coolant stream.

18. The method of claim 17, comprising the further step of pumping the circulating primary liquid coolant stream through a primary coolant loop including passing the primary liquid coolant stream through a primary heat exchanger, through a primary coolant passage within the reaction zone, and back to the primary heat exchanger.

19. The method of claim 18, comprising the further step of pumping the circulating secondary liquid coolant stream through a secondary coolant loop including passing the secondary liquid coolant stream through the secondary heat exchanger, through a secondary coolant passage within the condensation zone, and back to the secondary heat exchanger.

* * * * *